United States Patent
Yoshida et al.

(10) Patent No.: US 8,015,800 B2
(45) Date of Patent: Sep. 13, 2011

(54) INTERNAL COMBUSTION ENGINE

(75) Inventors: Kohei Yoshida, Gotenba (JP);
Takamitsu Asanuma, Mishima (JP);
Shinya Hirota, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1103 days.

(21) Appl. No.: 11/794,732

(22) PCT Filed: Dec. 1, 2006

(86) PCT No.: PCT/JP2006/324495
§ 371 (c)(1),
(2), (4) Date: Jul. 5, 2007

(87) PCT Pub. No.: WO2007/066743
PCT Pub. Date: Jun. 14, 2007

(65) Prior Publication Data
US 2008/0223020 A1 Sep. 18, 2008

(30) Foreign Application Priority Data
Dec. 5, 2005 (JP) .................................. 2005-351093

(51) Int. Cl.
*F01N 3/00* (2006.01)
(52) U.S. Cl. ................ 60/277; 60/274; 60/285; 60/286; 60/295; 60/301
(58) Field of Classification Search .................. 60/273, 60/274, 284–286, 295–301
See application file for complete search history.

(56) References Cited

U.S. PATENT DOCUMENTS

| | | | | |
|---|---|---|---|---|
| 6,192,675 B1 * | 2/2001 | Hirota et al. | ................ | 60/286 |
| 6,311,482 B1 * | 11/2001 | Yamashita | ................ | 60/285 |
| 6,679,050 B1 * | 1/2004 | Takahashi et al. | ............. | 60/285 |
| 2004/0006971 A1 * | 1/2004 | Kamoto et al. | ................ | 60/277 |

FOREIGN PATENT DOCUMENTS

| | | |
|---|---|---|
| EP | 1 519 015 A2 | 3/2005 |
| JP | A 2000-2133 | 1/2000 |
| JP | A 2001-20728 | 1/2001 |
| JP | A 2003-13786 | 1/2003 |
| JP | A 2003-129829 | 5/2003 |
| JP | A 2004-76681 | 3/2004 |
| JP | A 2004-245061 | 9/2004 |
| JP | A 2005-69218 | 3/2005 |

OTHER PUBLICATIONS

European Search Report for Application No. 06 83 4250, issued Jan. 19, 2010.

* cited by examiner

*Primary Examiner* — Thomas E Denion
*Assistant Examiner* — Jesse Bogue
(74) *Attorney, Agent, or Firm* — Oliff & Berridge, PLC

(57) ABSTRACT

An engine exhaust passage has an $SO_x$ trapping catalyst (11), a particulate filter (13) holding an $NO_x$ storing/reducing catalyst, and an $NO_x$ storing/reducing catalyst (15) forming a post-treatment system and a fuel feed valve (17) for feeding fuel for post processing in the post-treatment system arranged inside it. When any catalyst has a degree of degradation exceeding a predetermined degree of degradation, the method of feeding the post-treatment fuel is reset so that the post-treatment fuel required for purification of the exhaust gas can be fed into the catalyst with the lowest degree of degradation to make the catalyst with the lowest degree of degradation handle the purification action of the exhaust gas.

6 Claims, 9 Drawing Sheets

Fig. 2
(A)
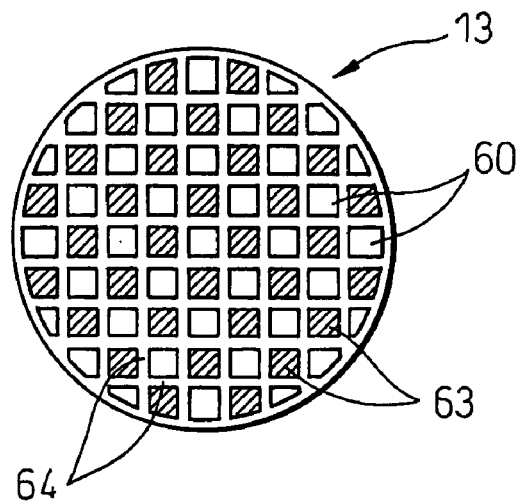
(B)
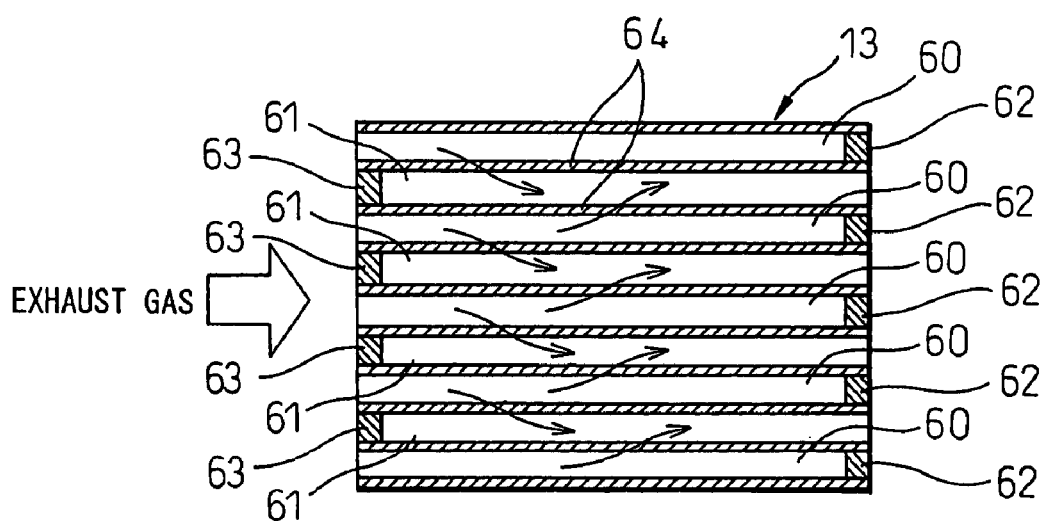

Fig.8
(A)
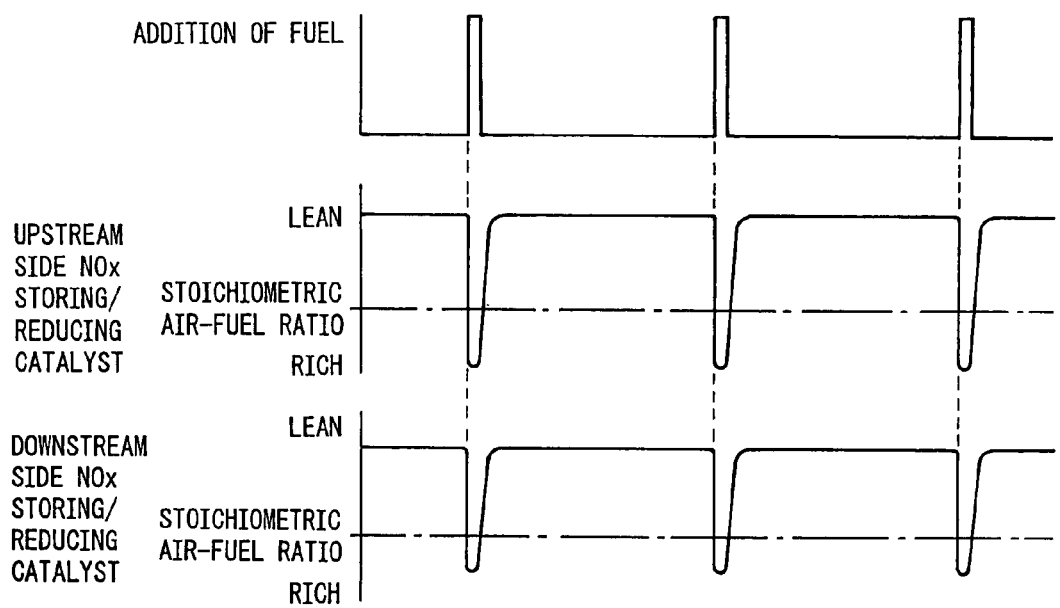
(B)
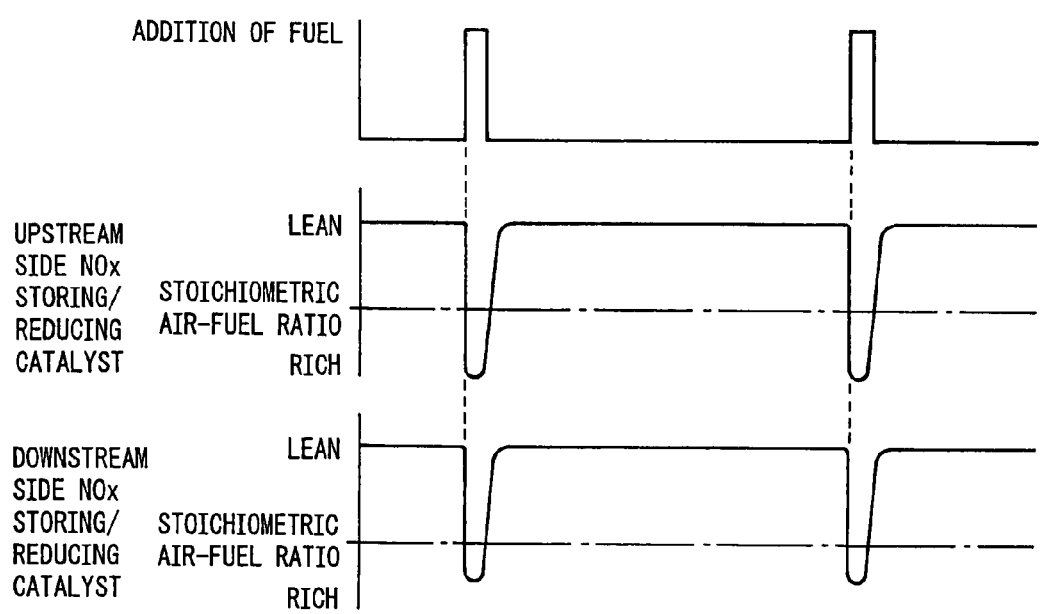

US 8,015,800 B2

INTERNAL COMBUSTION ENGINE

TECHNICAL FIELD

The present invention relates to an internal combustion engine.

BACKGROUND ART

Known in the art is an internal combustion engine wherein a post-treatment system of exhaust gas is comprised of a plurality of exhaust purification catalysts arranged in series in engine exhaust passage, a degree of degradation of each catalyst is found, and a degree of degradation of the post-treatment system as a whole is found from the degrees of degradation found for the catalysts (for example, see Japanese Patent Publication (A) No. 2004-76681).

However, in this case, to secure a good exhaust purification action, it is best to make the catalyst with the lowest degree of degradation among these catalysts handle the purification action of the exhaust gas. That is to say, when for example feeding the post treatment fuel when treating the harmful components in the exhaust gas, if making the catalyst with the lowest degree of degradation handle the purification action of the exhaust gas, a good exhaust purification action can be secured and, in addition, the amount of consumption of post treatment fuel can be reduced. However, in the above internal combustion engines, this is not being considered at all.

DISCLOSURE OF THE INVENTION

An object of the present invention is to provide an internal combustion engine able to secure a good exhaust purification action and reduce the amount of fuel consumption.

According to the present invention, there is provided an internal combustion engine in which a post-treatment system of exhaust gas is arranged in an engine exhaust passage, post-treatment fuel for treating the harmful components is fed in exhaust gas in the post-treatment system, and the method of feeding the post-treatment fuel is preset, wherein the post-treatment system has a plurality of exhaust purification catalysts arranged in series in an exhaust passage and, when any catalyst has a degree of degradation exceeding a predetermined degree of degradation, the method of feeding the post-treatment fuel is reset so that the post-treatment fuel required for purification of the exhaust gas can be fed into the catalyst with the lowest degree of degradation to make the catalyst with the lowest degree of degradation handle the purification action of the exhaust gas.

BRIEF DESCRIPTION OF THE DRAWINGS

FIG. 2 is a view showing the structure of a particulate filter,

FIG. 8 is a time chart showing processing for adding fuel from a fuel feed valve.

BEST MODE FOR CARRYING OUT THE INVENTION

Figure 1:
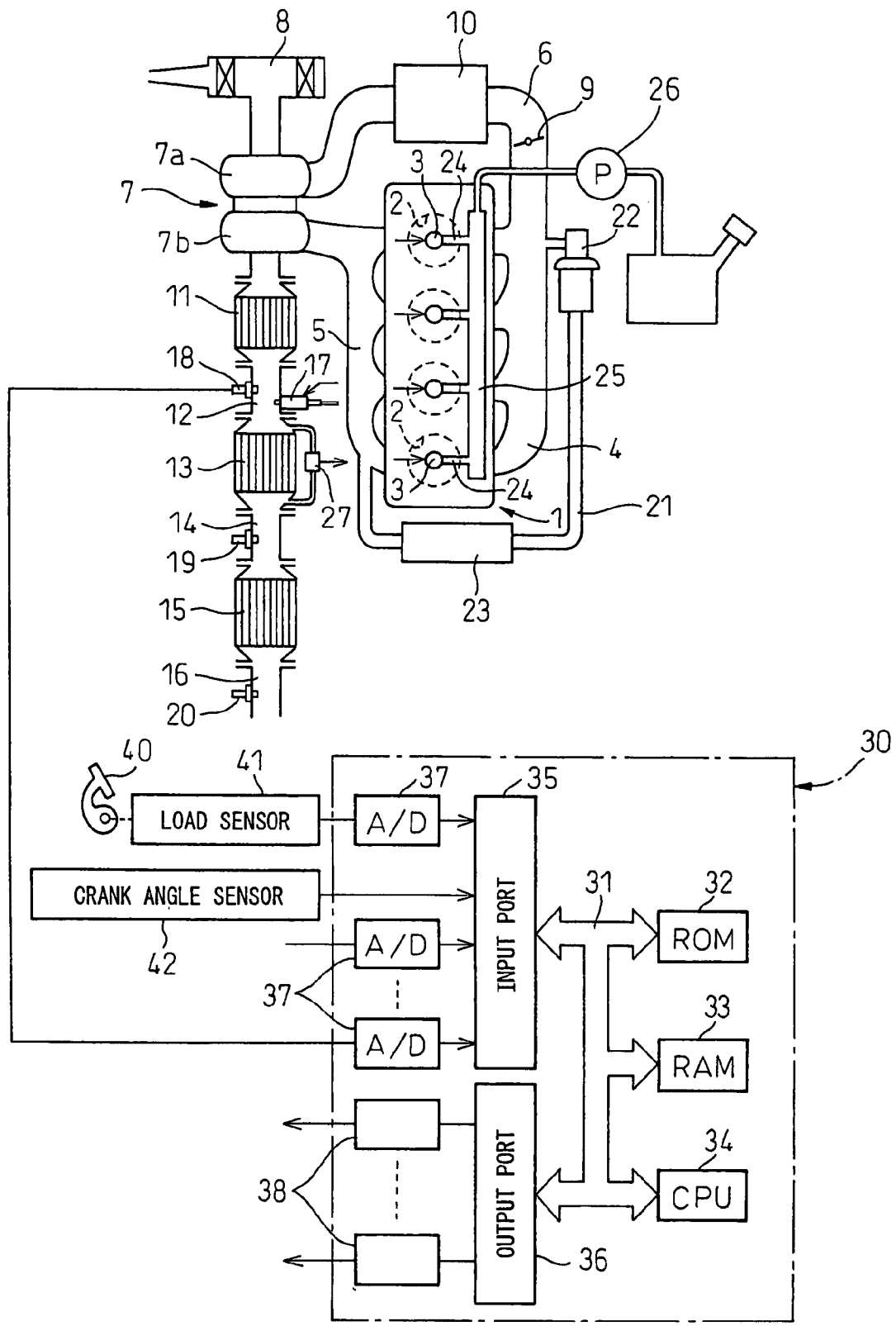
FIG. 1 is an overview of a combustion ignition type internal combustion engine.

FIG. 1 shows an overview of a combustion ignition type internal combustion engine.

Referring to FIG. 1, 1 indicates an engine body, 2 a combustion chamber of a cylinder, 3 an electronic control type fuel injector for injecting fuel into a combustion chamber 2, 4 an intake manifold, and 5 an exhaust manifold. The intake manifold 4 is connected via an intake duct 6 to an outlet of a compressor 7a of an exhaust turbocharger 7, while an inlet of the compressor 7a is connected to an air cleaner 8. The intake duct 6 has a throttle valve 9 driven by a step motor arranged inside it. Further, around the intake duct 6, a cooling system 10 for cooling the intake air flowing through the inside of the intake duct 6 is arranged. In the embodiment shown in FIG. 1, the engine cooling water is led into the cooling system 10 where the engine cooling water cools the intake air.

On the other hand, the exhaust manifold 5 is connected to an inlet of the exhaust turbine 7b of the exhaust turbocharger 7, while an outlet of the exhaust turbine 7b is connected to an inlet of an $SO_x$ trapping catalyst 11. Further, the outlet of the $SO_x$ trapping catalyst 11 is connected through an exhaust pipe 12 to the inlet of a particulate filter 13. The outlet of the particulate filter 13 is connected through an exhaust pipe 14 to an $NO_x$ storing/reducing catalyst 15. The exhaust pipe 12 is provided with a fuel feed valve 17 for feeding post-treatment fuel in the exhaust gas flowing through the inside of the exhaust pipe 12. Further, inside each of the exhaust pipes 12 and 14 and an exhaust pipe 16 connected to the outlet of the $NO_x$ storing/reducing catalyst 15, the sensors 18, 19, and 20 comprised of an air-fuel ratio sensor, $O_2$ sensor, $NO_x$ sensor, or $SO_x$ sensor are arranged.

The exhaust manifold 5 and the intake manifold 4 are connected through an exhaust gas recirculation (hereinafter referred to as an "EGR") passage 21. The EGR passage 21 has an electronic control type EGR control valve 22 arranged inside it. Further, around the EGR passage 21 is arranged a cooling system 23 for cooling the EGR gas flowing through EGR passage 21. In the embodiment shown in FIG. 1, the engine cooling water is led into the cooling system 23 where the engine cooling water cools the EGR gas. On the other hand, each fuel injector 3 is connected through a fuel feed pipe 24 to a common rail 25. This common rail 25 is fed with fuel from an electronic control type variable discharge fuel pump 26. The fuel fed into the common rail 25 is fed through each fuel feed pipe 24 to a fuel injector 3.

An electronic control unit 30 is comprised of a digital computer and is provided with components connected with each other through a bi-directional bus 31 such as an ROM (read only memory) 32, RAM (random access memory) 33, CPU (microprocessor) 34, input port 35, and output port 36. The output signals of the sensors 18, 19, and 20 are input through corresponding AD converters 37 to the input port 35. Further, the particulate filter 13 has a differential pressure sensor 27 for detecting the differential pressure before and after the particulate filter 13 attached to it. The output signal of this differential pressure sensor 27 is input through the corresponding AD converter 37 to the input port 35.

The accelerator pedal 40 has a load sensor 41 generating an output voltage proportional to the amount of depression L of the accelerator pedal 40 connected to it. The output voltage of the load sensor 41 is input through a corresponding AD converter 37 to the input port 35. Further, the input port 35 has a crank angle sensor 42 generating an output pulse each time the crankshaft rotates by for example 15° connected to it. On the other hand, the output port 36 is connected through corresponding drive circuits 38 to each fuel injector 3, throttle valve 9 drive step motor, fuel feed valve 17, EGR control valve 22, and fuel pump 26.

In the embodiment shown in FIG. 1, the particulate filter 13 arranged on the upstream side of the $NO_x$ storing/reducing catalyst 15 also carries an $NO_x$ storing/reducing catalyst. Therefore, first, the structure of the particulate filter 13 will be explained, then the $NO_x$ storing/reducing catalyst 15 and the $No_x$ storing/reducing catalyst carried on the particulate filter 13 will be explained.

FIGS. 2(A) and (B) show the structure of the particulate filter 13 carrying the $NO_x$ storing/reducing catalyst. Note that FIG. 2(A) is a front view of the particulate filter 13, while FIG. 2(B) shows a side cross-sectional view of the particulate filter 13. As shown in FIGS. 2(A) and (B), the particulate filter 13 forms a honeycomb structure and is provided with a plurality of exhaust flow passages 60, 61 extending in parallel to each other. These exhaust flow passages are comprised of exhaust gas inflow passages 60 with downstream ends closed by plugs 62 and exhaust gas outflow passages 61 with upstream ends closed by plugs 63. Note that the hatched parts in FIG. 2(A) show the plugs 63. Therefore, exhaust gas inflow passages 60 and exhaust gas outflow passages 61 are alternately arranged via thin partition walls 64. In other words, the exhaust gas inflow passages 60 and exhaust gas outflow passages 61 are arranged with each exhaust gas inflow passage 60 surrounded by four exhaust gas outflow passages 61 and with each exhaust gas outflow passage 61 surrounded by four exhaust gas inflow passages 60.

The particulate filter 13 is for example formed from a porous material such as cordierite. Therefore, the exhaust gas flowing into the exhaust gas inflow passages 60, as shown by the arrows in FIG. 2(B), passes through the surrounding partition walls 64 and flows into the adjoining exhaust gas outflow passages 61. In this particulate filter 13, an $NO_x$ storing/reducing catalyst is carried on the peripheral walls of the exhaust gas inflow passages 60 and exhaust gas outflow passages 61, that is, the two surfaces of the partition walls 64 and inside walls of the pores in the partition walls 64.

Figure 3:
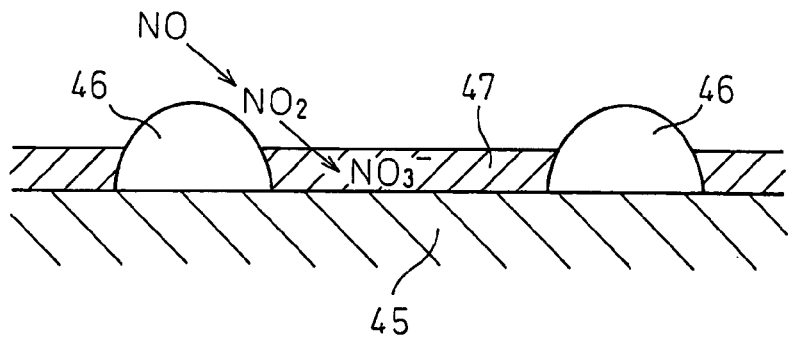
FIG. 3 is a cross-sectional view of a surface part of the catalyst carrier of an $NO_x$ storing/reducing catalyst.

In the $NO_x$ storing/reducing catalyst carried on the particulate filter 13 and the $NO_x$ storing/reducing catalyst 15, a catalyst carrier comprised of for example alumina is carried on a base member. FIG. 3 schematically shows the cross-section of the surface part of this catalyst carrier 45. As shown in FIG. 3, the surface of the catalyst carrier 45 carries a precious metal catalyst 46 diffused on it. Further, the surface of the catalyst carrier 45 is formed with a layer of an $NO_x$ absorbent 47.

In an embodiment according to the present invention, platinum Pt is used as the precious metal catalyst 46. As the component forming the $NO_x$ absorbent 47, for example, at least one element selected from potassium K, sodium Na, cesium Cs, and other alkali metals, barium Ba, calcium Ca and other alkali earths, lanthanum La, yttrium Y, and other rare earths is used.

If referring to the ratio of the air and fuel (hydrocarbons) fed into the engine intake passage, combustion chamber 2, and exhaust passage upstream of the particulate filter 13 as the "air-fuel ratio of the exhaust gas", the $NO_x$ absorbent 47 absorbs $NO_x$ when the air-fuel ratio of the exhaust gas is lean and releases the absorbed $NO_x$ when the concentration of oxygen in the exhaust gas falls, i.e. an absorption and release action of $NO_x$ is carried out.

That is, explaining this taking as an example the case of using barium Ba as the component forming the $NO_x$ absorbent 47, when the air-fuel ratio of the exhaust gas is lean, that is, when the concentration of oxygen in the exhaust gas is high, the NO contained in the exhaust gas is oxidized on the platinum Pt 46 and becomes $NO_2$ as shown in FIG. 3, then this is absorbed in the $NO_x$ absorbent 47 and bonds with the barium oxide BaO while diffusing in the form of nitrate ions $NO_3^-$ in the $NO_x$ absorbent 47. In this way, the $NO_x$ is absorbed in the $NO_x$ absorbent 47. So long as the concentration of oxygen in the exhaust gas is high, $NO_2$ is formed on the surface of the platinum Pt 46. So long as the $NO_x$ absorbent 47 does not become saturated in $NO_x$ absorption ability, the $NO_2$ is absorbed in the $NO_x$ absorbent 47 and nitrate ions $NO_3^-$ are generated.

As opposed to this, if using the fuel feed valve 17 to feed fuel so as to make the air-fuel ratio of the exhaust gas rich or the stoichiometric air-fuel ratio, the concentration of oxygen in the exhaust gas falls, so the reaction proceeds in the opposite direction ($NO_3^- \rightarrow NO_2$) and therefore the nitrate ions $NO_3^-$ in the $NO_x$ absorbent 47 are released in the form of $NO_2$ from the $NO_x$ absorbent 47. Next, the released $NO_x$ is reduced by the unburned HC and CO contained in the exhaust gas.

When the air-fuel ratio of the exhaust gas is lean in this way, that is, when combustion is performed under a lean air-fuel ratio, the $NO_x$ in the exhaust gas is absorbed in the $NO_x$ absorbent 47. However, if combustion is continuously performed under a lean air-fuel ratio, the $NO_x$ absorbent 47 eventually ends up becoming saturated in its $NO_x$ absorption ability and therefore the $NO_x$ absorbent 47 can no longer absorb $NO_x$. Therefore, in the embodiment according to the present invention, before the $NO_x$ absorbent 47 becomes saturated in absorption ability, fuel is fed from the fuel feed valve 17 so as to make the air-fuel ratio of the exhaust gas temporarily rich and thereby make the $NO_x$ absorbent 47 release $NO_x$.

However, the exhaust gas contains $SO_x$, that is, $SO_2$. When this $SO_2$ flows into the particulate filter 13 and $NO_x$ storing/reducing catalyst 15, this $SO_2$ is oxidized at the platinum Pt 46 and becomes $SO_3$. Next, this $SO_3$ is absorbed in the $NO_x$ absorbent 47 and bonds with the barium oxide BaO while being diffused in the form of sulfate ions $SO_4^{2-}$ in the $NO_x$ absorbent 47 so as to form the stable sulfate $BaSO_4$. However, the $NO_x$ absorbent 47 has a strong basicity, so this sulfate $BaSO_4$ is stable and hard to break down. By just making the air-fuel ratio of the exhaust gas rich, the sulfate $BaSO_4$ remains as it is without being broken down. Therefore, in the $NO_x$ absorbent 47, the sulfate $BaSO_4$ increases along with the elapse of time and therefore as time elapses, the amount of $NO_x$ which the $NO_x$ absorbent 47 can absorb falls.

Therefore, in the embodiment shown in FIG. 1, a $SO_x$ trapping catalyst 11 is arranged upstream of the particulate filter 13, this $SO_x$ trapping catalyst 11 is used to trap the $SO_x$ contained in the exhaust gas, and thereby $SO_x$ is prevented from flowing into the particulate filter 13 and $NO_x$ storing/reducing catalyst 15. Next, this $SO_x$ trapping catalyst 11 will be explained.

Figure 4:
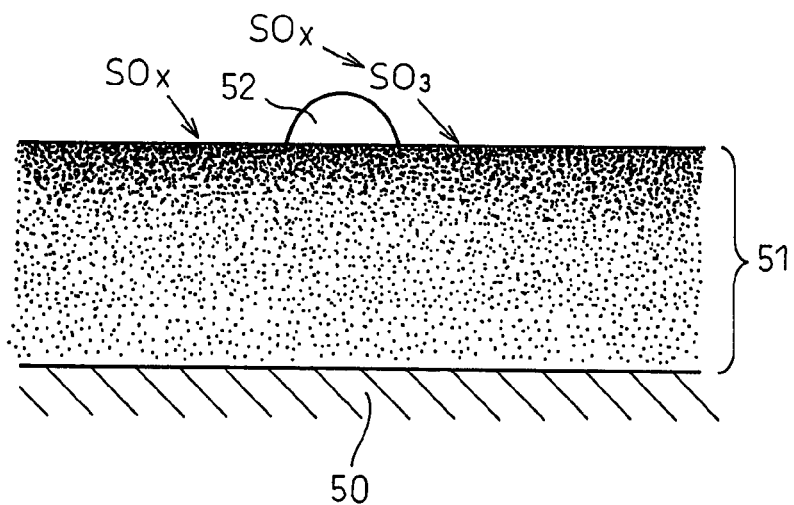
FIG. 4 is a cross-sectional view of a surface part of the catalyst carrier of an $SO_x$ trapping catalyst.

This $SO_x$ trapping catalyst 11 is for example comprised of a monolith catalyst of a honeycomb structure which has a large number of exhaust gas communication holes extending straight in the axial direction of the $SO_x$ trapping catalyst 11. When forming the $SO_x$ trapping catalyst 11 from a monolith catalyst of a honeycomb structure in this way, a catalyst carrier comprised of for example alumina is carried on the inner circumferential walls of the exhaust gas flow holes. FIG. 4 illustrates the cross-section of the surface part of this catalyst carrier 50. As shown in FIG. 4, the surface of the catalyst carrier 50 is formed with a coated layer 51. The surface of this coated layer 51 carries the precious metal catalyst 52 diffused in it.

In the embodiment shown in FIG. 1, platinum is used as the precious metal catalyst 52. As the component forming the coated layer 51, for example, at least one element selected from potassium K, sodium Na, cesium Cs, or another alkali metal, barium Ba, calcium Ca, or another alkali earth, lanthanum La, yttrium Y, or another rare earth is used. That is, the coated layer 51 of the $SO_x$ trapping catalyst 11 exhibits a strong basicity.

Now, the $SO_x$ contained in the exhaust gas, that is, the $SO_2$, as shown in FIG. 4, is oxidized at the platinum Pt 52 then is trapped in the coated layer 51. That is, the $SO_2$ diffuses in the form of sulfate ions $SO_4^{2-}$ in the coated layer 51 to form a sulfate. Note that as explained above, the coated layer 51 exhibits a strong basicity, therefore as shown in FIG. 4, part of the $SO_2$ contained in the exhaust gas is directly trapped in the coated layer 51.

The shading in the coated layer 51 in FIG. 4 shows the concentration of the trapped $SO_x$. As will be understood from FIG. 4, the $SO_x$ concentration in the coated layer 51 becomes highest near the surface of the coated layer 51 and gradually decreases the further to the inside. If the $SO_x$ concentration near the surface of the coated layer 51 becomes higher, the surface of the coated layer 51 becomes weaker in basicity and the ability to trap $SO_x$ is weakened. If the ability to trap $SO_x$ is weakened, part of the $SO_x$ contained in the exhaust gas starts to flow into the particulate filter 13 and the $NO_x$ absorbent 47 starts to absorb the $SO_x$.

Figure 5:
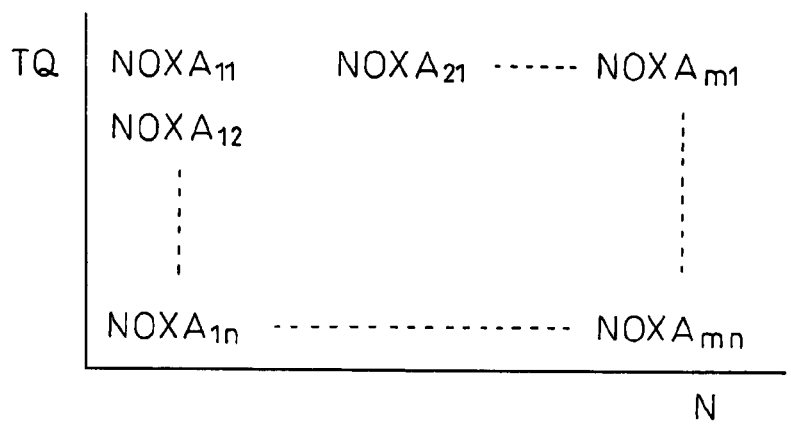
FIG. 5 is a view showing a map of the stored $NO_x$ amount NOXA.
Figure 6:
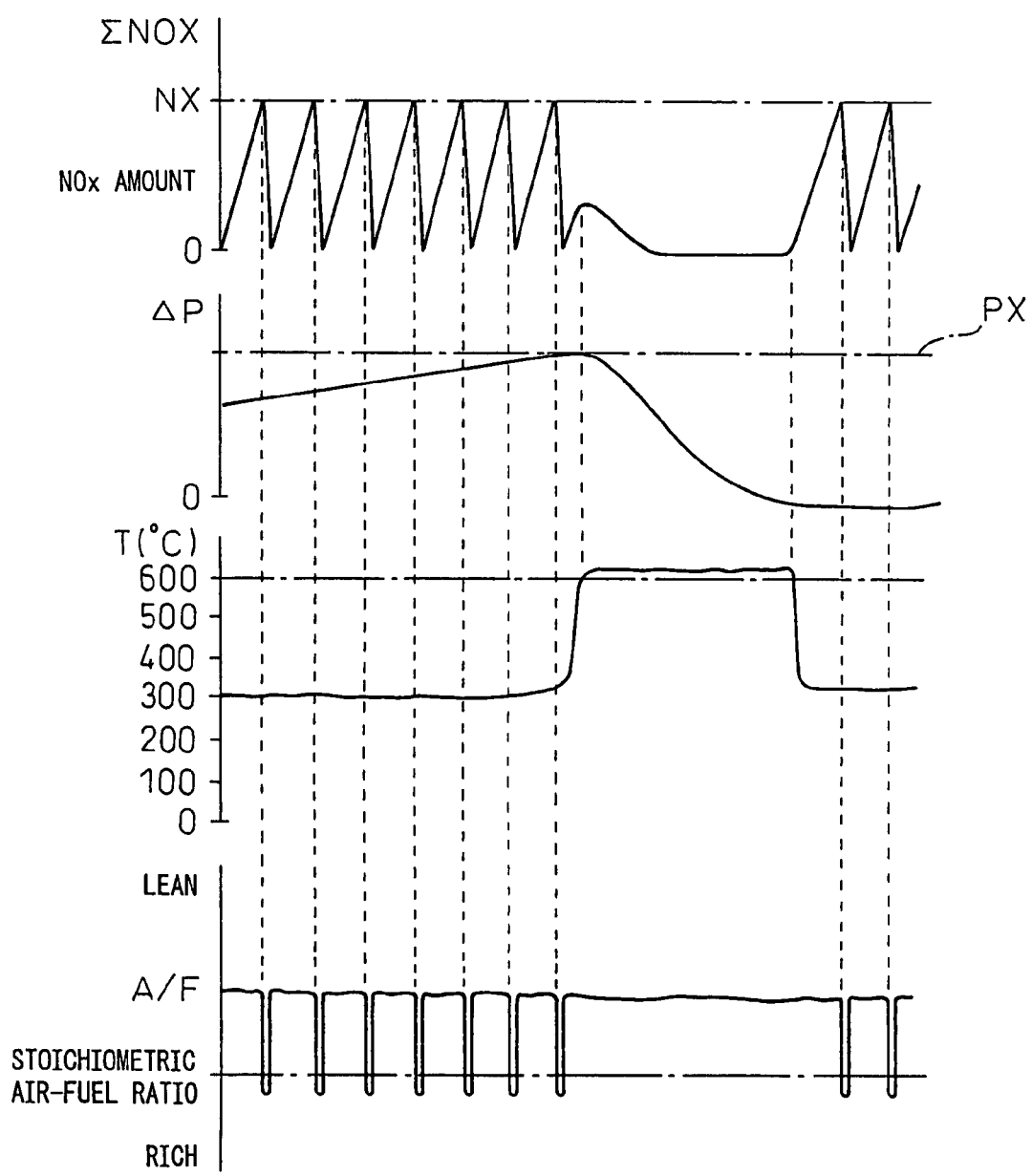
FIG. 6 is a time chart showing $NO_x$ release control and temperature raising control of the particulate filter.

Next, the treatment of the $NO_x$ storing/reducing catalyst carried on the particulate filter 13 and the $NO_x$ storing/reducing catalyst 15 will be explained with reference to FIG. 5 and FIG. 6. In the embodiment shown in FIG. 1, the $NO_x$ amount NOXA absorbed per unit time in the $NO_x$ absorbent 47 of the $NO_x$ storing/reducing catalyst carried on the particulate filter 13 and the $NO_x$ absorbent 47 of the $NO_x$ storing/reducing catalyst 15 is stored as a function of the required torque TQ and engine speed N in the form of the map shown in FIG. 5 in advance in the ROM 32. This $NO_x$ amount NOXA is integrated to calculate the $NO_x$ amount $\Sigma$NOX absorbed in the $NO_x$ absorbent 47. Further, in this embodiment, as shown in FIG. 6, the air-fuel ratio of the exhaust gas A/F flowing into the particulate filter 13 is temporarily made rich each time this $NO_x$ amount $\Sigma$NOX reaches the allowable value NX and thereby the $NO_x$ absorbent 47 releases $NO_x$.

Note that when making the air-fuel ratio A/F of the exhaust gas flowing into the particulate filter 13 rich, the air-fuel ratio of the exhaust gas flowing into the $SO_x$ trapping catalyst 11 has to be maintained lean. Therefore, in the embodiment shown in FIG. 1, a fuel feed valve 17 is arranged in the exhaust pipe 12 between the $SO_x$ trapping catalyst 11 and the particulate filter 13. When the $NO_x$ absorbent 47 should release $NO_x$, this fuel feed valve 17 feeds the exhaust pipe 12 with fuel, that is, post-treatment fuel, to thereby make the air-fuel ratio of the exhaust gas flowing into the particulate filter 13 temporarily rich.

On the other hand, the particulate, that is, the particulate matter, contained in the exhaust gas is trapped on the particulate filter 13 and successively oxidized. However, when the amount of trapped particulate becomes greater than the amount of oxidized particulate, the particulate gradually builds up on the particulate filter 13. In this case, if the amount of buildup of the particulate increases, a drop in the engine output ends up being incurred. Therefore, when the amount of buildup of the particulate increases, it is necessary to remove the builtup particulate. In this case, if raising the temperature of the particulate filter 13 to about 600° C. under an excess of air, the builtup particulate is oxidized and removed.

Therefore, in the embodiment shown in FIG. 1, when the amount of particulate built up on the particulate filter 13 exceeds an allowable amount, the temperature of the particulate filter 13 is raised under a lean air-fuel ratio of the exhaust gas and thereby the builtup particulate is removed by oxidation. Specifically, when the differential pressure $\Delta P$ before and after the particulate filter 13 detected by the differential pressure sensor 27 exceeds the allowable value PX as shown in FIG. 6, the amount of builtup particulate is judged to have exceeded the allowable amount. At this time, temperature raising control is performed to maintain the air-fuel ratio of the exhaust gas flowing into the particulate filter 13 lean while raising the temperature T of the particulate filter 13. Note that when the temperature T of the particulate filter 13 rises, $NO_x$ is released from the $NO_x$ absorbent 47, so the trapped $NO_x$ amount $\Sigma$NOX decreases.

When raising the temperature of the particulate filter 13, it is not necessary to raise the temperature of the $SO_x$ trapping catalyst 11. Therefore, when raising the temperature of the particulate filter 13, fuel, that is, post-treatment fuel, is fed from the fuel feed valve 17 in the range where the air-fuel ratio of the exhaust gas can be maintained lean. The heat of oxidation reaction of this fuel is used to raise the temperature T of the particulate filter 13.

Now, in the embodiment according to the present invention, as shown in FIG. 1, the post-treatment system has a plurality of exhaust purification catalysts arranged in series in the exhaust passage, that is, the $SO_x$ trapping catalyst 11, the $NO_x$ storing/reducing catalyst carried on the particulate filter 13, and the $NO_x$ storing/reducing catalyst 15. The degree of degradation of the catalyst is detected for each catalyst and the method of feeding the post-treatment fuel is reset in accordance with the degrees of degradation of the catalysts.

In this case, in the embodiment according to the present invention, when any catalyst of the $SO_x$ trapping catalyst 11, the $NO_x$ storing/reducing catalyst carried on the particulate filter 13, and the $NO_x$ storing/reducing catalyst 15 has a degree of degradation exceeding a predetermined degree of degradation, the method of feeding the post-treatment fuel is reset so that the post-treatment fuel required for purification of the exhaust gas can be fed into the catalyst with the lowest degree of degradation to make the catalyst with the lowest degree of degradation handle the purification action of the exhaust gas.

That is, in the embodiment according to the present invention, when any catalyst has a degree of degradation exceeding a predetermined degree of degradation, the catalyst having the lowest degree of degradation and therefore able to be utilized most effectively for purification of the exhaust is selected and the selected catalyst is made to handle the purification action of the exhaust gas by feeding post-treatment fuel by the most suitable method for the selected catalyst to purify the exhaust gas. By doing this, it is possible to maintain a high purification rate of exhaust gas while minimizing the amount of consumption of post-treatment fuel.

Next, the embodiment according to the present invention will be explained in detail.

In the embodiment according to the present invention, as time elapses, $SO_x$ is gradually stored in the $SO_x$ trapping catalyst 11 and $NO_x$ absorbent 47. In this case, $SO_x$ poisoning, that is, catalyst degradation, occurs successively from the upstream side catalyst. In the example shown in FIG. 1, as the sensors 18, 19, and 20, $SO_x$ sensors are used. Whether the catalysts have degraded is detected by the output signals of the $SO_x$ sensors 18, 19, and 20. That is, when the $SO_x$ concentration detected by the $SO_x$ sensor 18 exceeds the predetermined concentration, the $SO_x$ trapping catalyst 11 is judged to have degraded. When the $SO_x$ concentration detected by the $SO_x$ sensor 19 exceeds a predetermined concentration, the $NO_x$ storing/reducing catalyst on the particulate filter 13 is judged to have degraded. When the $SO_x$ concentration detected by the $SO_x$ sensor 20 exceeds a predetermined concentration, the $NO_x$ storing/reducing catalyst 15 is judged to have degraded.

Figure 7:
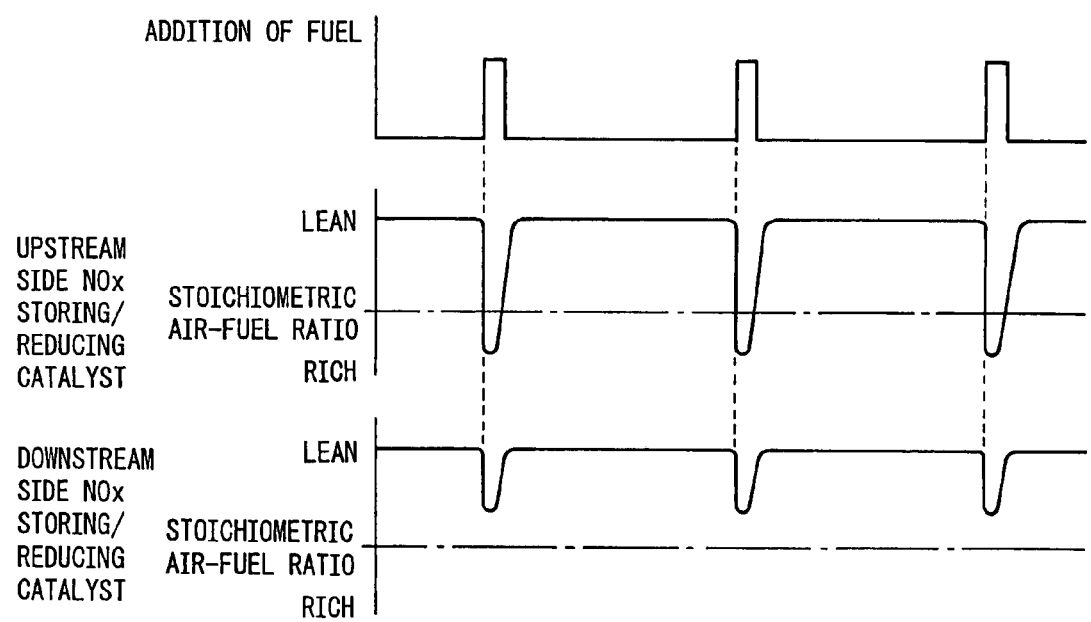
FIG. 7 is a time chart showing processing for adding fuel from a fuel feed valve.

Next, the control for release of $NO_x$ from the $NO_x$ storing/reducing catalyst will be explained, but in explaining this, below, the $NO_x$ storing/reducing catalyst carried on the particulate filter 13 will be referred to as the "upstream side $NO_x$ storing/reducing catalyst 13", while the $NO_x$ storing/reducing catalyst 15 will be referred to as the "downstream side $NO_x$ storing/reducing catalyst 15". However, as explained above, before the $NO_x$ absorbent 47 becomes saturated with $NO_x$, the $NO_x$ absorbent 47 releases the $NO_x$. FIG. 7 shows the control for release of $NO_x$ when neither the upstream side $NO_x$ storing/reducing catalyst 13 nor the downstream side $NO_x$ storing/reducing catalyst 15 has degraded.

In this case, as shown in FIG. 7, if the fuel is added from the fuel feed valve 17 so that the $NO_x$ absorbent 47 releases $NO_x$, the air-fuel ratio of the exhaust gas flowing into the upstream side $NO_x$ storing/reducing catalyst 13 becomes temporarily rich. At this time, the action of the upstream side $NO_x$ storing/reducing catalyst 13 releasing $NO_x$ is performed. In this case, all of the fuel added from the fuel feed valve 17 is used for the action of releasing and reducing the $NO_x$ from the upstream side $NO_x$ storing/reducing catalyst 13.

On the other hand, when the upstream side $NO_x$ storing/reducing catalyst 13 is judged to have degraded, the downstream side $NO_x$ storing/reducing catalyst 15 is made to handle the purification action of the exhaust gas and, at this time, the action of absorption and release of the $NO_x$ in the exhaust gas is performed at the downstream side $NO_x$ storing/reducing catalyst 15. In this case, if using a pattern shown in FIG. 7 the same as when the upstream side $NO_x$ storing/reducing catalyst 13 has not degraded so as to have the fuel feed valve 17 add fuel, the added fuel ends up becoming dispersed before reaching the downstream side $NO_x$ storing/reducing catalyst 15 and the air-fuel ratio of the exhaust gas flowing into the downstream side $NO_x$ storing/reducing catalyst 15 ends up no longer becoming rich.

Therefore, in this embodiment according to the present invention, the degree of richness of the air-fuel ratio of the exhaust gas when making the air-fuel ratio of the exhaust gas flowing into the downstream side $NO_x$ storing/reducing catalyst 15 at this time rich by having the fuel feed valve 17 add fuel is made higher compared with the case shown in FIG. 7.

Note that in this case, when raising the degree of richness of the air-fuel ratio of the exhaust gas so that the amount of consumption of fuel does not increase, as shown in FIG. 8(A), the rich time of the air-fuel ratio is made shorter. Alternatively, when raising the degree of richness of the air-fuel ratio of the exhaust gas and not changing the rich time of the air-fuel ratio, as shown in FIG. 8(B), the intervals between which the air-fuel ratio is made rich are made longer.

Figure 9:
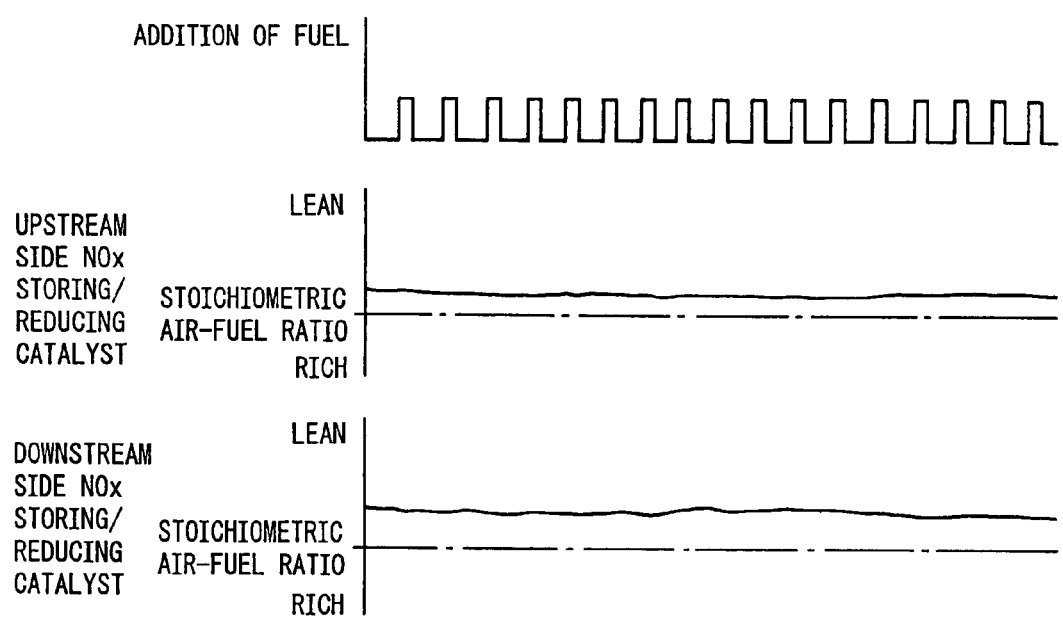
FIG. 9 is a time chart showing processing for adding fuel from a fuel feed valve.

However, if the $NO_x$ storing/reducing catalyst has degraded, the $NO_x$ storing/reducing catalyst only functions as a selective reduction catalyst. In this case, if the fuel feed valve 17 adds fuel in the state where the air-fuel ratio of the exhaust gas is lean, the unburned HC is used so that the $NO_x$ in the exhaust gas is selectively reduced. The $NO_x$ purification rate is not high, but $NO_x$ can be purified to a certain degree. Therefore, in this embodiment according to the present invention, in addition to the upstream side $NO_x$ storing/reducing catalyst 13, the fuel feed valve 17 is made to intermittently add fuel in the state with the air-fuel ratio of the exhaust gas maintained in the lean range as shown in FIG. 9 when the downstream side $NO_x$ storing/reducing catalyst 14 has degraded.

Figure 10:
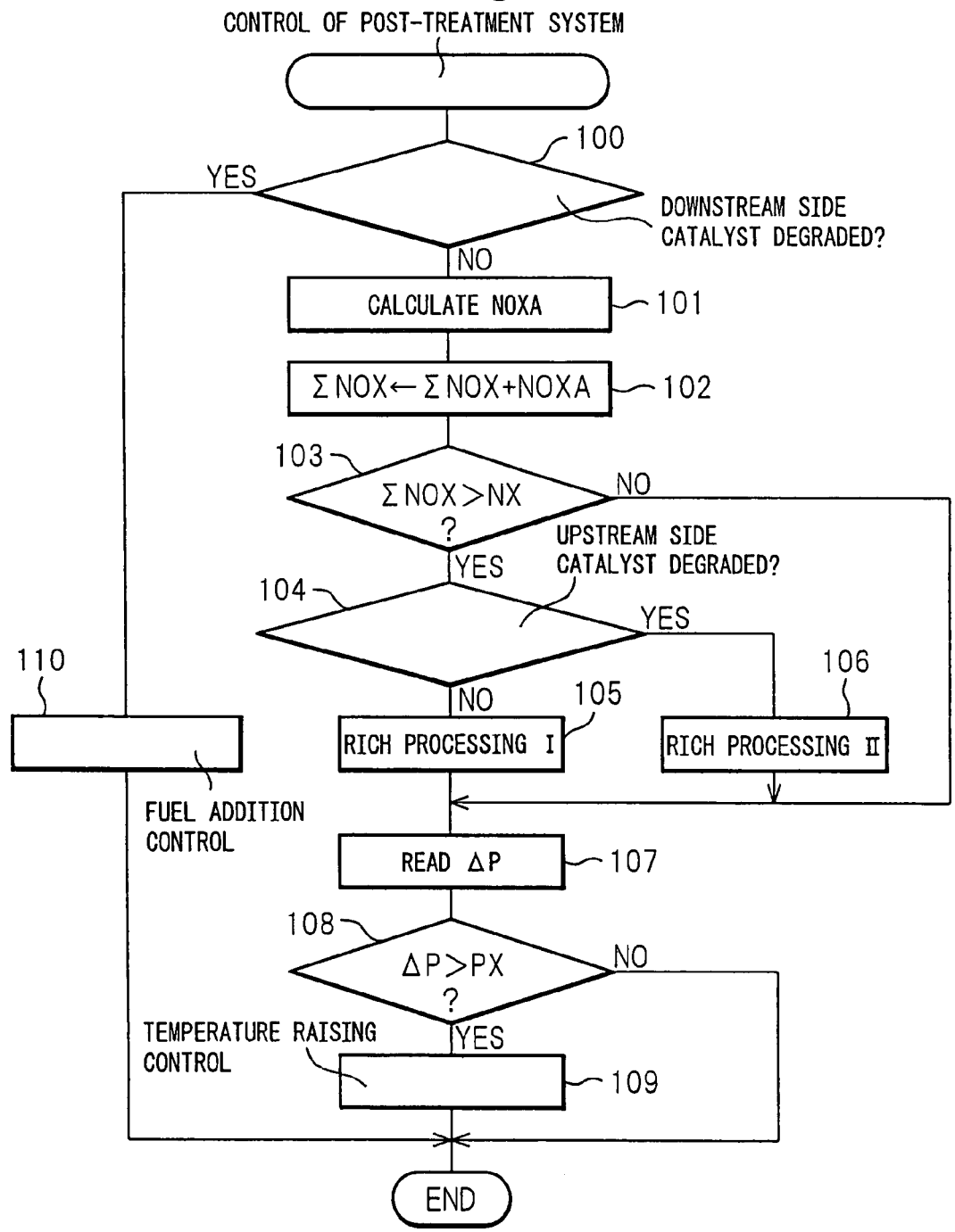
FIG. 10 is a flow chart for control of the post-treatment system.

FIG. 10 shows the control routine of the post-treatment system.

Referring to FIG. 10, first, at step 100, whether the downstream side $NO_x$ storing/reducing catalyst 15 has degraded is judged. When the downstream side $NO_x$ storing/reducing catalyst 15 is not degraded, the routine proceeds to step 101 where the map shown in FIG. 5 is used to calculate the $NO_x$ amount NOXA stored per unit time. Next, at step 102, this NOXA is added to the $NO_x$ amount ΣNOX absorbed in the $NO_x$ absorbent 47.

Next, at step 103, whether the stored $NO_x$ amount ΣNOX has exceeded the allowable value NX is judged. When ΣNOX≦NX, the routine jumps to step 107. As opposed to this, when ΣNOX>NX, the routine proceeds to step 104 where whether the upstream side $NO_x$ storing/reducing catalyst 13 has degraded or not is judged. When the upstream side $NO_x$ storing/reducing catalyst 13 has degraded, the routine proceeds to step 105 where the rich processing I shown in FIG. 7 is performed, then the routine proceeds to step 107. As opposed to this, when the upstream side $NO_x$ storing/reducing catalyst 13 is judged to have degraded, the routine proceeds to step 106 where the rich processing II shown in FIG. 8(A) or (B) is performed, then the routine proceeds to step 107.

At step 107, the differential pressure sensor 27 is used to detect the differential pressure ΔP before and after the particulate filter 13. Next, at step 108, whether the differential pressure ΔP has exceeded the allowable value PX is judged. When ΔP>PX, the routine proceeds to step 109 where control is performed to raise the temperature of the particulate filter 13. This temperature raising control is performed to maintain the air-fuel ratio of the exhaust gas flowing into the particulate filter 13 lean while the fuel feed valve 17 supplies fuel. On the other hand, when at step 100 the downstream side $NO_x$ storing/reducing catalyst 13 is judged to have degraded, the routine proceeds to step 110 where processing is performed to add fuel as shown in FIG. 9.

Figure 11:
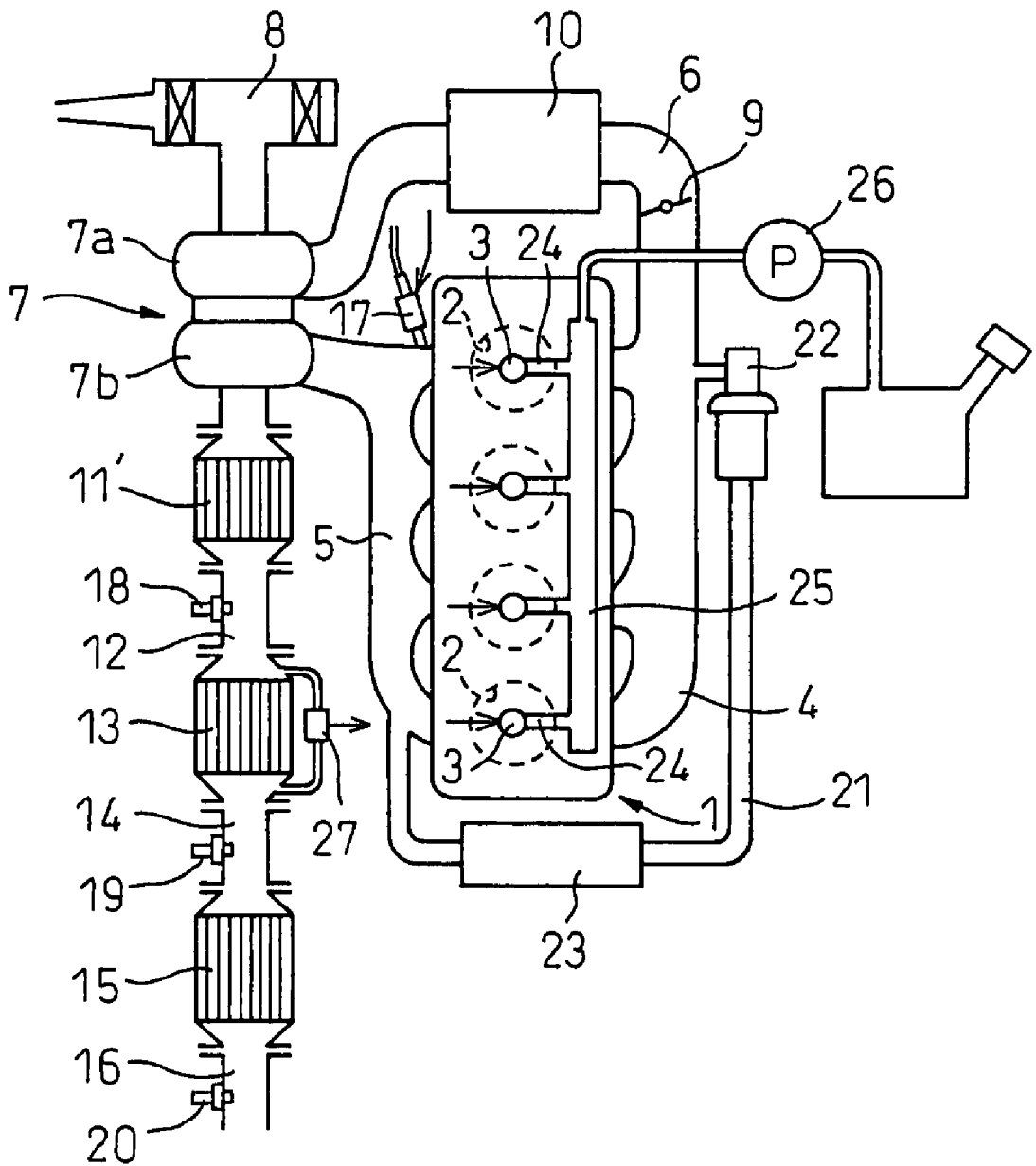
FIG. 11 is an overview showing another embodiment of a combustion ignition type internal combustion engine.

FIG. 11 shows another embodiment of a combustion ignition type internal combustion engine. In this embodiment, instead of the $SO_x$ trapping catalyst, an $NO_x$ storing/reducing catalyst 11' is arranged. Further, in this embodiment, a fuel feed valve 17 is arranged in the manifold branch pipe of for example the No. 1 cylinder of the exhaust manifold 5. In this embodiment, when the $NO_x$ storing/reducing catalyst 11', $NO_x$ storing/reducing catalyst carried on the particulate filter 13, or $NO_x$ storing/reducing catalyst 15 should release $NO_x$, the fuel feed valve 17 supplies fuel. Note that in this embodiment as well, when any of the $NO_x$ storing/reducing catalysts becomes higher in degree of degradation, the further downstream the $NO_x$ storing/reducing catalyst with the lowest degree of degradation is positioned, the higher the degree of richness of the exhaust gas when releasing the $NO_x$.

List Of Reference Numerals

4 . . . intake manifold
5 . . . exhaust manifold
7 . . . exhaust turbocharger
11 . . . $SO_x$ trapping catalyst 13 ... particulate filter
15 ... $NO_x$ storing/reducing catalyst
17 ... fuel feed valve

The invention claimed is:

1. An internal combustion engine comprising:
an exhaust passage;
a post-treatment system arranged in the exhaust passage, the post-treatment system including at least an upstream side exhaust purification catalyst and a downstream side exhaust purification catalyst arranged in series in the exhaust passage; and
a control device that controls the post-treatment system such that when the upstream side exhaust purification catalyst has a degree of degradation exceeding a predetermined degree of degradation, a method of feeding fuel is reset to a fuel feed method so that the fuel required for purification of exhaust gas in the exhaust passage can be fed into the downstream side exhaust purification catalyst to make an air-fuel ratio of the exhaust gas entering the downstream side exhaust purification catalyst temporarily rich so that the downstream side exhaust purification catalyst can handle a purification action of the exhaust gas, wherein:
the upstream side exhaust purification catalyst and the downstream side exhaust purification catalyst arranged in series in the exhaust passage are comprised of $NO_x$ storing/reducing catalysts storing $NO_x$ contained in the exhaust gas when an air-fuel ratio of inflowing exhaust gas is lean and releasing the stored $NO_x$ when the air-fuel ratio of the inflowing exhaust gas becomes a stoichiometric air-fuel ratio or rich,
when making the air-fuel ratio of the exhaust gas flowing into a $NO_x$ storing/reducing catalyst rich so that the $NO_x$ storing-reducing catalyst releases $NO_x$, post-treatment fuel is fed in a combustion chamber or in the exhaust passage upstream of the $NO_x$ storing/reducing catalyst positioned at the most upstream side, and
the further downstream a catalyst with a lowest degree of degradation is positioned, a higher a degree of richness the air-fuel ratio of the exhaust gas is made.

2. An internal combustion engine as set forth in claim 1, wherein when raising a degree of richness of the air-fuel ratio of the exhaust gas, a rich time of the air-fuel ratio is made shorter.

3. An internal combustion engine as set forth in claim 1, wherein when raising a degree of richness of the air-fuel ratio of the exhaust gas, intervals between which the air-fuel ratio is made rich are made longer.

4. An internal combustion engine as set forth in claim 1, where when degrees of degradation of all of the $NO_x$ storing/reducing catalysts exceed predetermined degrees of degradation and the $NO_x$ storing/reducing catalysts only function as selective reduction catalysts, the post-treatment fuel is fed to the combustion chamber or in the exhaust passage upstream of the $NO_x$ storing/reducing catalyst positioned at the most upstream side in a state with the air-fuel ratio of the exhaust gas maintained in the lean range.

5. An internal combustion engine as set forth in claim 1, wherein the exhaust passage upstream of the $NO_x$ storing/reducing catalyst positioned at the most upstream side has an $SO_x$ trapping catalyst able to trap $SO_x$ in the exhaust gas.

6. An internal combustion engine as set forth in claim 1, wherein:
the control device controls the post-treatment system such that:
when the upstream side exhaust purification catalyst has the degree of degradation exceeding the predetermined degree of degradation, the method of feeding fuel is reset to a first fuel feed method so that the fuel required for purification of exhaust gas in the exhaust passage can be fed into the downstream side exhaust purification catalyst to make the downstream side exhaust purification catalyst handle the purification action of the exhaust gas, and
when the downstream side exhaust purification catalyst has a degree of degradation exceeding a predetermined degree of degradation, the method of feeding fuel is reset to second fuel feed method so that the fuel required for purification of the exhaust gas in the exhaust passage can be fed into the upstream side exhaust purification catalyst to make the upstream side exhaust purification catalyst handle the purification action of the exhaust gas, and
the first fuel feed method is not the same as the second fuel feed method.

* * * * *